United States Patent
Deng et al.

(10) Patent No.: US 10,917,255 B2
(45) Date of Patent: Feb. 9, 2021

(54) PACKET SWITCHED SERVICE IDENTIFICATION METHOD AND TERMINAL

(71) Applicant: Huawei Technologies Co., Ltd., Shenzhen (CN)

(72) Inventors: Yu Deng, Shanghai (CN); Songping Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/301,308

(22) PCT Filed: May 27, 2016

(86) PCT No.: PCT/CN2016/083743
§ 371 (c)(1),
(2) Date: Nov. 13, 2018

(87) PCT Pub. No.: WO2017/193427
PCT Pub. Date: Nov. 16, 2017

(65) Prior Publication Data
US 2019/0199539 A1    Jun. 27, 2019

(30) Foreign Application Priority Data

May 10, 2016   (WO) ................ PCT/CN2016/081524

(51) Int. Cl.
*H04L 12/14*   (2006.01)
*H04L 29/06*   (2006.01)
*H04W 76/25*   (2018.01)

(52) U.S. Cl.
CPC ........ *H04L 12/1407* (2013.01); *H04L 69/162* (2013.01); *H04W 76/25* (2018.02); *H04L 69/16* (2013.01)

(58) Field of Classification Search
None
See application file for complete search history.

(56) References Cited

U.S. PATENT DOCUMENTS 8,144,874 B2    3/2012  McGough
2004/0153545 A1  8/2004  Pandya et al.
(Continued)

FOREIGN PATENT DOCUMENTS

CN    101005383 A    7/2007
CN    101447934 A    6/2009
(Continued)

OTHER PUBLICATIONS

Foreign Communication From a Counterpart Application, European Application No. 16901382.8, Extended European Search Report dated Feb. 25, 2019, 8 pages.
Machine Translation and Abstract of Chinese Publication No. CN101005383, Jul. 25, 2007, 17 pages.
Machine Translation and Abstract of Chinese Publication No. CN101447934, Feb. 11, 2015, 13 pages.
(Continued)

*Primary Examiner* — Yaotang Wang
(74) *Attorney, Agent, or Firm* — Conley Rose, P.C.

(57) ABSTRACT

A packet switched (PS) service identification method and a terminal, where a weight of at least one socket corresponding to a PS service is determined, a key socket is determined from the at least one socket according to the weight of the at least one socket, and an identifier of the key socket is sent to a network side such that the network side formulates a policy and charging control (PCC) rule according to the 5-tuple. In this PS service identification process, because the terminal does not encrypt the PS service, the terminal can accurately identify the PS service.

20 Claims, 4 Drawing Sheets

(56) References Cited

U.S. PATENT DOCUMENTS

| | | | |
|---|---|---|---|
| 2008/0069116 | A1 | 3/2008 | Pong |
| 2009/0201944 | A1* | 8/2009 | Aoki ................ H04L 29/08846 370/466 |
| 2009/0201994 | A1 | 8/2009 | Schwarz et al. |
| 2012/0072612 | A1 | 3/2012 | Flinta et al. |
| 2013/0227670 | A1* | 8/2013 | Ahmad ............... H04L 41/5054 726/11 |
| 2014/0112278 | A1 | 4/2014 | Liang et al. |
| 2014/0321448 | A1* | 10/2014 | Backholm ............... H04L 43/10 370/338 |
| 2016/0353319 | A1 | 12/2016 | Damola |

FOREIGN PATENT DOCUMENTS

| | | | |
|---|---|---|---|
| CN | 102223307 | A | 10/2011 |
| CN | 102265563 | A | 11/2011 |
| CN | 102710528 | A | 10/2012 |
| CN | 103250462 | A | 8/2013 |
| CN | 103618726 | A | 3/2014 |
| CN | 103714139 | A | 4/2014 |
| CN | 103828481 | A | 5/2014 |
| CN | 104348675 | A | 2/2015 |
| CN | 104780080 | A | 7/2015 |
| CN | 105471927 | A | 4/2016 |
| WO | 0055970 | A2 | 9/2000 |
| WO | 2012149725 | A1 | 11/2012 |
| WO | 2013025534 | A1 | 2/2013 |

OTHER PUBLICATIONS

Machine Translation and Abstract of Chinese Publication No. CN103618726, Mar. 5, 2014, 21 pages.
Machine Translation and Abstract of Chinese Publication No. CN103828481, May 28, 2014, 42 pages.
Machine Translation and Abstract of Chinese Publication No. CN104348675, Feb. 11, 2015, 18 pages.
Machine Translation and Abstract of Chinese Publication No. CN104780080, Jul. 15, 2015, 14 pages.
Machine Translation and Abstract of Chinese Publication No. CN105471927, Apr. 6, 2016, 29 pages.
Machine Translation and Abstract of International Publication No. WO2012149725, Nov. 8, 2012, 21 pages.
Foreign Communication From a Counterpart Application, PCT Application No. PCT/CN2016/083743, English Translation of International Search Report dated Feb. 6, 2017, 2 pages.
Foreign Communication From a Counterpart Application, PCT Application No. PCT/CN2016/083743, English Translation of Written Opinion dated Feb. 6, 2017, 4 pages.
Foreign Communication From a Counterpart Application, PCT Application No. PCT/CN2016/081524, International Search Report dated Jan. 20, 2017, 7 pages.
Foreign Communication From a Counterpart Application, PCT Application No. PCT/CN2016/081524, Written Opinion dated Jan. 20, 2017, 4 pages.

* cited by examiner

PACKET SWITCHED SERVICE IDENTIFICATION METHOD AND TERMINAL

CROSS-REFERENCE TO RELATED APPLICATIONS

This application is a U.S. National Stage of International Patent Application No. PCT/CN2016/083743 filed May 27, 2016, which claims priority to International Patent Application No. PCT/CN2016/081524 filed on May 10, 2016. Both of the aforementioned applications are hereby incorporated by reference in their entireties.

TECHNICAL FIELD

Embodiments of the present invention relate to communications technologies, and in particular, to a packet switched service identification method and a terminal.

BACKGROUND

To provide differentiated services for a user, the 3rd Generation Partnership Project (3rd Generation Partnership Project, 3GPP) standard organization formulates a Policy and Charging Control (Policy and Charging Control, PCC) architecture. In the PCC architecture, a policy and charging rules function (Policy and Charging Rule Function, PCRF) server formulates different Policy and Charging Control rules (PCC Rule) for different packet switched (Packet switching, PS) services, and sends the rules to a policy and charging enforcement function (Policy and Charging Enforcement Function, PCEF) server. The PCEF server finally executes the PCC rule. Therefore, control is performed on the user and quality of service (Quality of Service, QoS) of a service.

In the foregoing architecture, the PCRF server formulates a PCC rule for a PS service in the following two manners. Manner 1: An embedded deep packet inspection (Deep Packet Inspect, DPI) function or a Traffic Detection Function (Traffic Detection Function, TDF) of the PCEF server is used to identify the PS service, and an identification result is reported to the PCRF server, so that the PCRF server formulates the PCC rule according to the identification result. Manner 2: An application function (Application Function, AF) identifies the PS service, and reports an identification result to the PCRF server, so that the PCFR server formulates the PCC rule according to the identification result. In the Manner 1 and the Manner 2, the identification result includes a service identifier, a media type, a media stream status, media stream description, and the like.

With a growing quantity of encrypted Hypertext Transfer Protocol Servers (hyper Text Transport Protocol Server, HTTPS), when the user accesses the encrypted HTTPS, a PS service is transmitted in an HTTPS manner, and content of the PS service is encrypted. Therefore, in this case, a service type of the PS service, a destination of the PS service, and the like cannot be identified in the manner 1 and the manner 2. Consequently, an identification rate of the PS service is low, and the PCRF cannot formulate a PCC rule applicable to the PS service.

SUMMARY

Embodiments of the present invention provide a packet switched service identification method and a terminal, so that the terminal identifies a PS service, to improve PS service identification accuracy.

According to an aspect, an embodiment of the present invention provides a packet switched service identification method. The method is described from a perspective of a terminal. In the method, the terminal determines a weight of at least one socket corresponding to a packet switched PS service; determines a key socket from the at least one socket according to the weight of the at least one socket; and finally, sends an identifier of the key socket to a network side, so that the network side formulates a PCC rule according to the 5-tuple. In this PS service identification process, because the terminal does not encrypt the PS service before sending the PS service, the terminal can accurately identify the PS service. In addition, for a specific PS service, the terminal may determine an application that is of the terminal and to which the PS service belongs, and does not need to perform parsing. Therefore, PS service identification accuracy can be further improved.

In a possible implementation, the weight of the socket indicates survival duration of the socket. In this case, that the terminal determines a weight of at least one socket is specifically: The terminal determines survival duration of each of the at least one socket. Correspondingly, that the terminal determines a key socket from the at least one socket according to the weight of the at least one socket is specifically: The terminal uses, as a key socket, a socket that is in the at least one socket and whose survival duration exceeds a first threshold. A connection of the key socket is a Transmission Control Protocol TCP persistent connection. In this solution, when the weight indicates the survival duration of the socket, the key socket in the PS service may be determined according to the survival duration of the socket.

In a possible implementation, the weight of the socket indicates an interaction frequency between the socket and a service server, and the service server is a server that bears a service corresponding to the socket. In this case, that the terminal determines a weight of at least one socket is specifically: The terminal determines an interaction frequency between each of the at least one socket and the service server. Correspondingly, that the terminal determines a key socket from the at least one socket according to the weight of the at least one socket is specifically: The terminal uses, as a key socket, a socket that is in the at least one socket and whose interaction frequency exceeds a second threshold. A connection of the key socket is a Transmission Control Protocol TCP short connection or a User Datagram Protocol UDP short connection. When the weight indicates the interaction frequency between the socket and the service server, the key socket in the PS service may be determined according to the interaction frequency between the socket and the service server.

In a possible implementation, before the terminal determines the weight of the at least one socket, the following is further included: The terminal detects that a status of the at least one socket changes. By detecting that the status of the socket changes, the terminal is triggered to determine the weight of the at least one socket corresponding to the packet switched PS service, that is, the terminal is triggered to identify the key socket in the PS service.

In a possible implementation, the weight of the socket indicates an importance degree of a service keyword corresponding to the socket. In this case, that the terminal determines a weight of at least one socket is specifically: The terminal determines an importance degree of a service keyword corresponding to each of the at least one socket.

Correspondingly, that the terminal determines a key socket from the at least one socket according to the weight of the at least one socket is specifically: The terminal uses, as a key socket, a socket that is in the at least one socket and whose importance degree of a service keyword exceeds a third threshold. When the weight indicates the importance degree of the service keyword corresponding to the socket, the key socket in the PS service may be determined according to the importance degree of the service keyword corresponding to the socket.

In a possible implementation, before the terminal determines the weight of the at least one socket, the following is further included: The terminal finds the service keyword from upstream data; or the terminal finds the service keyword from downstream data. By detecting the service keyword from the upstream data or the downstream data, the terminal is triggered to determine the weight of the at least one socket corresponding to the packet switched PS service, that is, the terminal is triggered to identify the key socket in the PS service.

In a possible implementation, before the terminal determines the weight of the at least one socket, the following is further included: The terminal determines a set of key PS services; and the terminal determines that the PS service belongs to the set of key PS services. Only when the PS service is identified as a key PS service, the key socket in the PS service is identified, to avoid blindness of identifying key sockets in all PS services.

In a possible implementation, there are at least two key sockets, and that the terminal sends an identifier of the key socket to a network side device is specifically: The terminal sequentially sends identifiers of the at least two key sockets to the network side device according to weights of the at least two key sockets. The 5-tuples of the key sockets are sent according to the weights, so that a 5-tuple of a key socket with a higher weight is preferentially sent, and the network side allocates a resource to the socket with a higher weight.

In a possible implementation, the network side device includes at least one of the following devices: an application function AF, a policy and charging enforcement function PCEF server, or a policy and charging rules function PCRF server.

According to another aspect, an embodiment of the present invention provides a terminal, including:

a processing module, configured to: determine a weight of at least one socket, where the at least one socket is a socket included in a packet switched PS service, and determine a key socket from the at least one socket according to the weight of the at least one socket; and a transceiver module, configured to send an identifier of the key socket to a network side device.

In a possible implementation, the weight of the socket indicates survival duration of the socket, and the processing module is specifically configured to: determine survival duration of each of the at least one socket, and use, as a key socket, a socket that is in the at least one socket and whose survival duration exceeds a first threshold, where a connection of the key socket is a Transmission Control Protocol TCP persistent connection.

In a possible implementation, the weight of the socket indicates an interaction frequency between the socket and a service server, and the service server is a server that bears a service corresponding to the socket; and the processing module is specifically configured to: determine an interaction frequency between each of the at least one socket and the service server, and use, as a key socket, a socket that is in the at least one socket and whose interaction frequency exceeds a second threshold, where a connection of the key socket is a Transmission Control Protocol TCP short connection or a User Datagram Protocol UDP short connection.

In a possible implementation, before determining the weight of the at least one socket, the processing module is further configured to detect that a status of the at least one socket changes.

In a possible implementation, the weight of the socket indicates an importance degree of a service keyword corresponding to the socket; and the processing module is specifically configured to: determine an importance degree of a service keyword corresponding to each of the at least one socket, and use, as a key socket, a socket that is in the at least one socket and whose importance degree of a service keyword exceeds a third threshold.

In a possible implementation, before determining the weight of the at least one socket, the processing module is further configured to: find the service keyword from upstream data, or find the service keyword from downstream data.

In a possible implementation, before determining the weight of the at least one socket, the processing module is further configured to: determine a set of key PS services, and determine that the PS service belongs to the set of key PS services.

In a possible implementation, there are at least two key sockets, and the transceiver module is specifically configured to sequentially send identifiers of the at least two key sockets to the network side device according to weights of the at least two key sockets.

In a possible implementation, the network side device includes at least one of the following devices: an application function AF, a policy and charging enforcement function PCEF server, or a policy and charging rules function PCRF server.

According to still another aspect, an embodiment of the present invention provides a terminal, including: a processor, a memory, a transceiver, and a system bus, where the memory, the transceiver, and the processor are connected and implement mutual communication by using the system bus; the memory is configured to store a computer execution instruction;

the processor is configured to: determine a weight of at least one socket, where the at least one socket is a socket included in a packet switched PS service, and determine a key socket from the at least one socket according to the weight of the at least one socket; and the transceiver is configured to send an identifier of the key socket to a network side device.

In a possible implementation, the weight of the socket indicates survival duration of the socket, and the processor is specifically configured to: determine survival duration of each of the at least one socket, and use, as a key socket, a socket that is in the at least one socket and whose survival duration exceeds a first threshold, where a connection of the key socket is a Transmission Control Protocol TCP persistent connection.

In a possible implementation, the weight of the socket indicates an interaction frequency between the socket and a service server, and the service server is a server that bears a service corresponding to the socket; and the processor is specifically configured to: determine an interaction frequency between each of the at least one socket and the service server, and use, as a key socket, a socket that is in the at least one socket and whose interaction frequency exceeds a second threshold, where a connection of the key socket is a Transmission Control Protocol TCP short connection or a User Datagram Protocol UDP short connection.

In a possible implementation, before determining the weight of the at least one socket, the processor is further configured to detect that a status of the at least one socket changes.

In a possible implementation, the weight of the socket indicates an importance degree of a service keyword corresponding to the socket; and the processor is specifically configured to: determine an importance degree of a service keyword corresponding to each of the at least one socket, and use, as a key socket, a socket that is in the at least one socket and whose importance degree of a service keyword exceeds a third threshold.

In a possible implementation, before determining the weight of the at least one socket, the processor is further configured to: find the service keyword from upstream data, or find the service keyword from downstream data.

In a possible implementation, before determining the weight of the at least one socket, the processor is further configured to: determine a set of key PS services, and determine that the PS service belongs to the set of key PS services.

In a possible implementation, there are at least two key sockets, and the transceiver is specifically configured to sequentially send identifiers of the at least two key sockets to the network side device according to weights of the at least two key sockets.

In a possible implementation, the network side device includes at least one of the following devices: an application function AF, a policy and charging enforcement function PCEF server, or a policy and charging rules function PCRF server.

According to still another aspect, an embodiment of the present invention provides a terminal, including: a processor, a memory, a communications interface, and a system bus, where the memory, the communications interface, and the processor are connected and implement mutual communication by using the system bus, the memory is configured to store a computer execution instruction, the communications interface is configured to communicate with another device, and the processor is configured to run the computer execution instruction, so that the terminal performs the steps of the method applied to the terminal.

According to yet another aspect, an embodiment of the present invention provides a terminal. The terminal has a function of implementing actions of a first terminal in the foregoing method design. The function may be implemented by using hardware, or may be implemented by executing corresponding software by hardware. The hardware or the software includes one or more units corresponding to the foregoing function.

In a possible implementation, a structure of the terminal includes a processor and a transmitter. The processor is configured to support the first terminal to execute the corresponding function in the foregoing method. The transmitter is configured to: support communication between the terminal and another terminal, and send information or an instruction used in the foregoing method to the another terminal. The terminal further includes a memory. The memory is configured to couple with the processor, and the memory stores a program instruction and data that are necessary for the terminal.

According to yet another aspect, an embodiment of the present invention provides a computer storage medium, configured to store a computer software instruction used by the foregoing terminal, and the computer storage medium includes a program designed for executing the foregoing aspects.

According to yet another aspect, an embodiment of the present invention provides a chip system, including at least one processor, a memory, an input/output part, and a bus. The at least one processor is configured to obtain an instruction in the memory by using the bus, to implement a design function of the terminal in the foregoing method.

According to the packet switched service identification method and the terminal provided in the embodiments of the present invention, the weight of the at least one socket corresponding to the packet switched PS service is determined; the key socket is determined from the at least one socket according to the weight of the at least one socket; and finally, the identifier of the key socket is sent to the network side, so that the network side formulates a PCC rule according to the 5-tuple. In this identification process, because the terminal does not encrypt the PS service before sending the PS service, the terminal can accurately identify the PS service. In addition, for a specific PS service, the terminal may determine an application that is of the terminal and to which the PS service belongs, and does not need to perform parsing. Therefore, PS service identification accuracy can be further improved.

DESCRIPTION OF EMBODIMENTS

Figure 1:
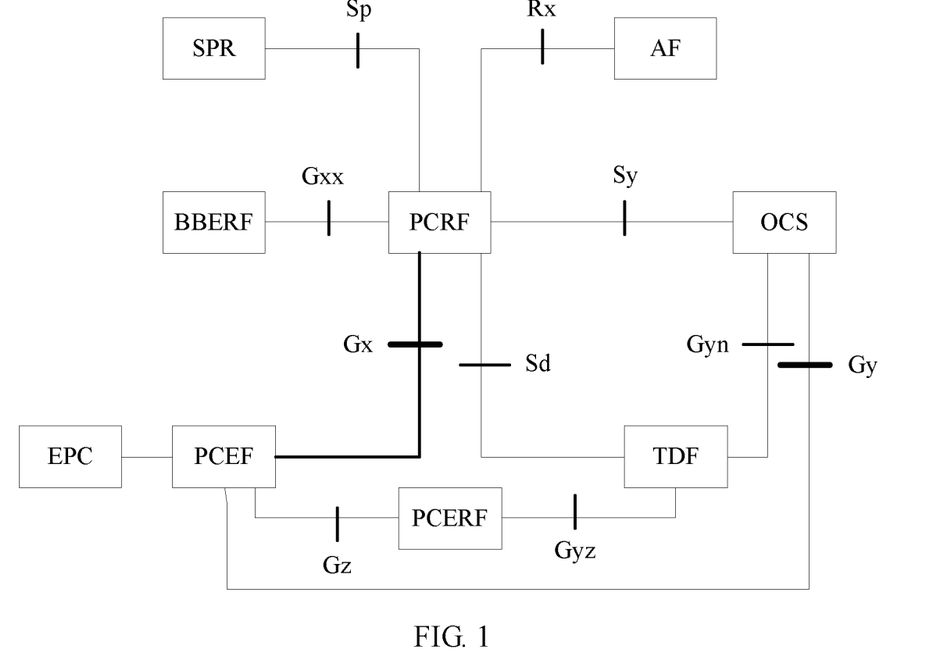
FIG. 1 is a schematic diagram of a PCC architecture.
Figure 2:
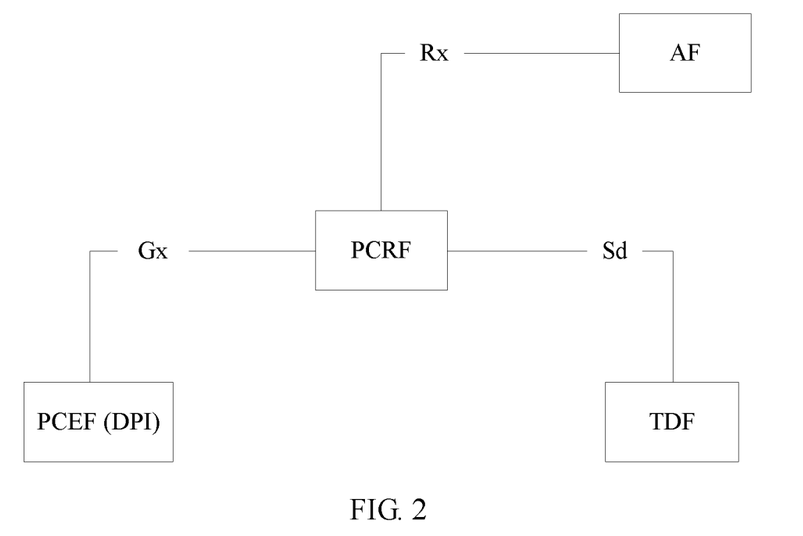
FIG. 2 is a simplified diagram of FIG. 1.

Currently, in a PCC architecture, a network side device identifies a PS service. FIG. 1 is a schematic diagram of a PCC architecture. FIG. 2 is a simplified diagram of FIG. 1.

Referring to FIG. 1 and FIG. 2, a network element in the PCC architecture includes: a subscription profile repository (Subscription Profile Repository, SPR), a bearer binding and event reporting function (Bearing Binding and Event Report Function, BBERF) server, a PCEF server, a PCRF server, an offline charging system (Offline Charging System, OFCS), an application function (Application Function, AF), an online charging system (Online Charging System, OCS), a Traffic Detection Function (Traffic Detection Function, TDF) server, an evolved packet core (Evolved Packet Core, EPC) network, and the like. The SPR and the PCRF server are interconnected and networked by using an Sp interface. The PCRF server performs policy control on a user according to user data and user subscription data that are obtained from the SPR. The PCRF server and the BBERF server are interconnected and networked by using a Gxx interface, and the PCRF server performs policy control on an evolved high rate packet data (Evolved High Rate Package Data, eHRPD) user. The PCRF server and the PCER server are interconnected and networked by using a Gx interface, and the PCRF server performs policy control on a user in a Global System for Mobile Communications (Global System for Mobile communications, GSM), a Code Division Multiple Access (Code Division Multiple Access, CDMA) system, a Universal Mobile Telecommunications System (Universal Mobile Telecommunications System, UMTS), a Long Term Evolution (Long Term Evolution, LTE) system, an x digital subscriber line (X Digital Subscriber Line, XDSL), or a Local Area Network (Local Area Network, LAN). The PCEF server and the OFCS server are interconnected and networked by using a Gz interface. The PCEF server and the OCS are interconnected and networked by using a Gy interface. The AF and the PCRF server are interconnected and networked by using an Rx interface. The AF and the PCRF are interacted by using the Rx interface, and the PCRF and the PCEF are interacted by using the Gx interface, so that policy control is performed on a user in an IP multimedia subsystem (IP Multimedia Subsystem, IMS), for example, QoS guarantee of a VoLTE (Voice over LTE) service. The PCRF server and the OCS are interconnected and networked by using an Sy interface. The PCRF server and the TDF server are interconnected and networked by using an Sd interface. The OFCS and the TDF server are interconnected and networked by using a Gzn interface. The TDF server and the OCS are interconnected and networked by using a Gyn interface. The EPC is connected to the PCEF.

To implement control on a user and QoS of a service, the PCRF formulates a PCC rule for a PS service. In a formulation process, if the manner 1 is used, the PS service is identified by using an embedded DPI function or a TDF function of the PCEF server; or if the manner 2 is used, the AF sends a related attribute of the PS service to the PCRF.

With a growing quantity of encrypted HTTPSs, a PS service is transmitted in an HTTPS manner, and a data packet of the PS service is encrypted. Therefore, if the manner 1 and the manner 2 are still used, decryption needs to be performed before identification is performed. If an error occurs in a decryption process, a service type of the PS service, a destination of the PS service, and the like cannot be identified in the manner 1 and the manner 2. Consequently, an identification rate of the PS service is low, and the PCRF cannot formulate a PCC rule applicable to the PS service. In addition, even if there is no error in the process of decrypting the data packet, because a network side does not know which application of a terminal sends the data packet of the PS service, the network side needs to parse all data packets to identify the PS service. Consequently, a large quantity of data packets need to be parsed, an error easily occurs in a parsing process, a speed is low, and further, the identification rate of the PS service is low.

In view of this, the embodiments of the present invention provide a packet switched service identification method and a terminal, so that the terminal identifies a PS service, to improve PS service identification accuracy.

Technologies described in the embodiments of the present invention may be applied to a PCC architecture in various communications systems, for example, 2G and 3G communications systems and a next-generation communication system, for example, a Global System for Mobile Communications (Global System for Mobile communications, GSM), a Code Division Multiple Access (Code Division Multiple Access, CDMA) system, a Time Division Multiple Access (Time Division Multiple Access, TDMA) system, Wideband Code Division Multiple Access (Wideband Code Division Multiple Access Wireless, WCDMA), a Frequency Division Multiple Access (Frequency Division Multiple Addressing, FDMA) system, an orthogonal frequency division multiple access (Orthogonal Frequency-Division Multiple Access, OFDMA) system, a single carrier FDMA (SC-FDMA) system, a general packet radio service (General Packet Radio Service, GPRS) system, a Long Term Evolution (Long Term Evolution, LTE) system, an E-UTRA system, a Universal Mobile Telecommunications System (Universal Mobile Telecommunications System, UMTS), an x digital subscriber line (X Digital Subscriber Line, XDSL), and other such communications systems. It may be understood that the embodiments of the present invention are also applicable to a wireless local area network (Wireless Local Area Network, WLAN), such as a Wireless Fidelity (Wireless Fidelity, WiFi) technology.

The terminal used in this application may be a wired terminal or a wireless terminal. The wireless terminal may be a device that provides voice and/or data connectivity for a user, a handheld device with a wireless connection function, or another processing device connected to a wireless modem. The wireless terminal may communicate with one or more core networks by using a radio access network (for example, RAN, Radio Access Network). The wireless terminal may be a mobile terminal such as a mobile phone (also referred to as a "cellular" phone), or a computer with a mobile terminal. For example, the wireless terminal may be a portable, pocket-sized, handheld, computer built-in, or in-vehicle mobile apparatus that exchanges voice and/or data with the radio access network. For example, the wireless terminal may be a device such as a personal communications service (Personal Communication Service, PCS) phone, a cordless telephone set, a Session Initiation Protocol (SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile station (Mobile), a remote station (Remote Station), a remote terminal (Remote Terminal), an access terminal (Access Terminal), a user terminal (User Terminal), a user agent (User Agent), a user device (User Device), or user equipment (User Equipment).

The following describes in detail the packet switched service identification method in the embodiments of the present invention. For details, refer to FIG. 1.

Figure 3:
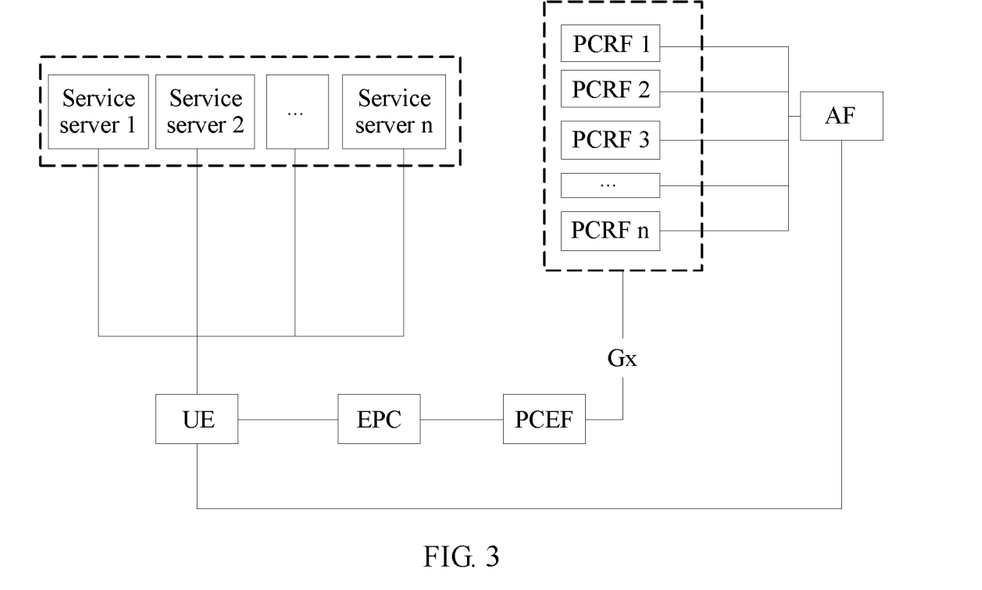
FIG. 3 is a schematic diagram of a network architecture to which a packet switched service identification method is applicable according to the present invention.

FIG. 3 is a schematic diagram of a network architecture to which a packet switched service identification method is applicable according to the present invention. As shown in FIG. 3, in the network architecture, UE is connected to a service server and an evolved packet core (Evolved Packet Core, EPC) network, and is further connected to an AF. The AF and a PCRF server are mutually connected, the PCRF server and a PCEF server are networked by using a Gx interface, and the EPC is connected to the PCEF. There may be multiple service servers, configured to provide services for different applications. There are multiple PCRFs, and different PCRFs formulate PCC rules for different PS services.

It should be noted that FIG. 3 shows that data exchange exists between the UE and the service server. Therefore, the UE and the service server are connected. However, during actual networking, there may be another network element between the UE and the service server, such as a server gateway (Service gate way, S-GW). The PCC rule formulated by the PCRF may reach the service server by using the another network element, so as to provide differentiated services for the UE. In addition, although the PCEF server, the PCRF server, and an EPC in FIG. 3 are separately designed, in actual implementation, the PCEF server may be a functional unit of the PCRF server, and integrated with the PCRF server. Similarly, the PCRF server and the EPC may be integrated.

Based on FIG. 3, the following describes in detail the packet switched service identification method in the embodiments of the present invention. For details, refer to FIG. 4.

Figure 4:
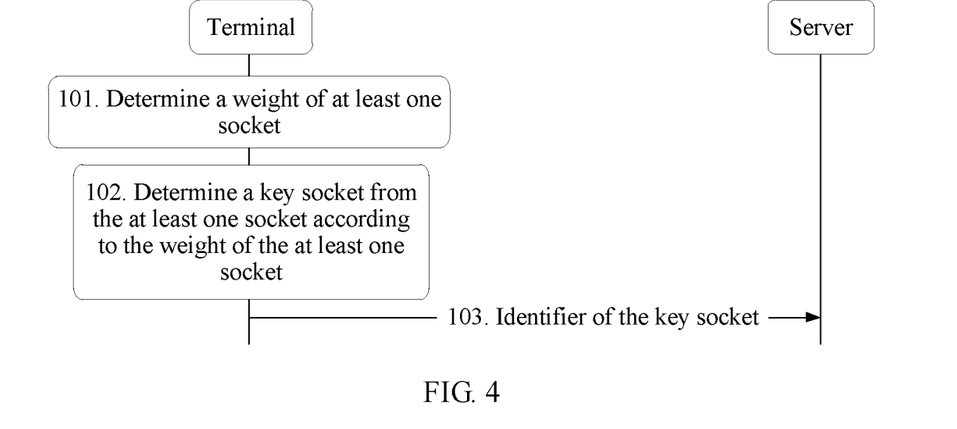
FIG. 4 is a flowchart of Embodiment 1 of a packet switched service identification method according to the present invention.

FIG. 4 is a flowchart of Embodiment 1 of a packet switched service identification method according to the present invention. This embodiment is executed by a terminal, and is applicable to a scenario in which the terminal needs to identify a PS service. Specifically, this embodiment includes the following steps.

101. The terminal determines a weight of at least one socket.

Generally, one application includes multiple PS services, and each PS service includes at least one socket (socket). A WeChat application is used as an example. In the WeChat application, sending a text message may be considered as a PS service, sending an image message may be considered as another PS service, sharing on Moments may be considered as still another PS service, and grabbing a red packet may be considered as still another PS service. Grabbing a red packet is used as an example. A socket included in the PS service is: a socket that bears a red packet grabbing notification (which is invisible to a user) that is to be sent by a service server to the terminal, a socket that bears a message instructing the terminal to obtain a red packet image from the service server, a socket that bears a message instructing the user to tap the red packet image, and the like.

In this embodiment of the present invention, a PS service identification process is a process of identifying a key socket in a PS service. The terminal sends the identified key socket to a network device, so that a specific service is formulated for the service corresponding to the key socket. In the PS service identification process, the terminal first filters multiple applications, to identify a key application, and then identifies a key socket from a PS service included in the key application. For example, a configuration file stored in the terminal indicates which application is a key application, further indicates which PS service in the key application is a key PS service, and further indicates which socket in the key PS service is a key socket. Therefore, the key socket can be finally determined by using a record in the configuration file and by means of filtering layer by layer. It may be understood that the terminal may store the foregoing information in a configuration file form, or may store the foregoing information in a text, a database, or another storage form. This is not specifically limited in this embodiment of the present invention. The configuration file is used as an example for description in the following embodiment of the present invention.

After the key socket is identified, an identifier of the key socket, a service identifier of the PS service, and a terminal identifier are sent to an AF. The AF determines a corresponding PCRF server according to the terminal identifier, and further sends the 5-tuple, the service identifier of the PS service, and the like to the PCRF server. Finally, the PCRF server formulates a PCC rule and delivers the PCC rule to a PCEF server. An identifier of a socket may be a 4-tuple, a 5-tuple, a 7-tuple, or the like of the socket. When the identifier of the socket is a 4-tuple, the 4-tuple is a set including a source IP source, a source port, a destination IP address, and a destination port. When the identifier of the socket is a 5-tuple, in addition to information included in the 4-tuple, the 5-tuple further includes a transport layer protocol. When the identifier of the socket is a 7-tuple, in addition to information included in the 5-tuple, the 7-tuple further includes a service type and an interface index. The terminal identifier is, for example, an international mobile subscriber identity (International Mobile Subscriber Identification Number, IMSI), or an international mobile equipment identity (International Mobile Equipment Identity, IMEI).

In addition, from a perspective of "key" or "non-key", a PS service may fall into two types: a key PS service and a non-key PS service. In this step, after the key PS service is identified, remaining PS services are non-key PS services. In this embodiment of the present invention, PS service identification mainly means identifying a key socket included in the key PS service, for example, identifying a 5-tuple of the key socket. Certainly, no limitation is imposed in this embodiment of the present invention. For example, when the network side allocates sufficient network resources to the terminal, the terminal may also identify a socket included in the non-key service, or identify a non-key socket included in the key service.

In the foregoing identification process, because a terminal side does not encrypt the PS service, the terminal may accurately identify the PS service.

102. The terminal determines a key socket from the at least one socket according to the weight of the at least one socket.

In this step, the terminal determines a weight of each socket included in the PS service. If the weight is larger, it indicates that the socket is more important. Correspondingly, if the weight is smaller, it indicates that the socket is less important. The following describes in detail a service identification software architecture of the terminal, and how the terminal determines a socket as a key socket based on the service architecture.

First, the service identification software architecture of the terminal is described.

Figure 5:
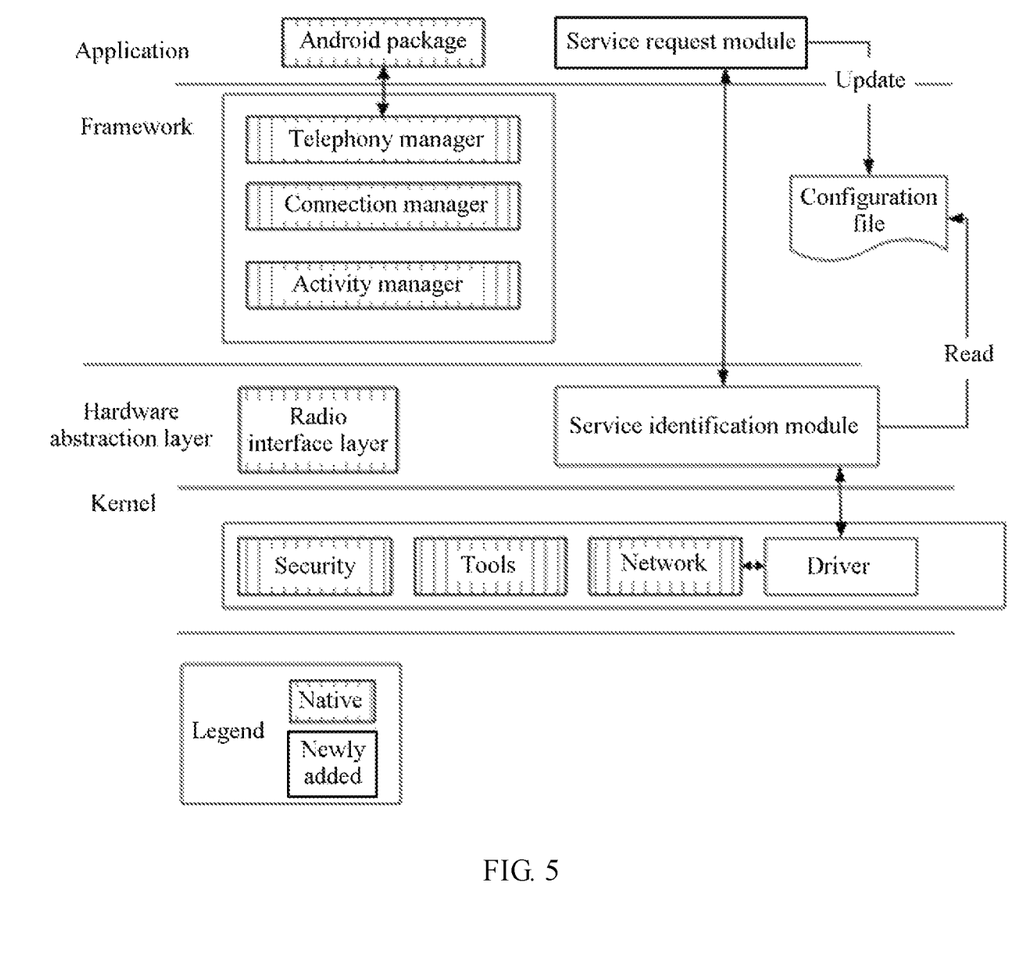
FIG. 5 is a diagram of a service identification software architecture of a terminal to which a packet switched service identification method is applicable according to the present invention.

FIG. 5 is a diagram of a service identification software architecture of a terminal to which a packet switched service identification method is applicable according to the present invention. Referring to FIG. 5, the software architecture of the terminal includes four layers: an application (APP) layer, a framework (Framework) layer, a hardware abstraction layer (hardware abstraction layer, HAL), and a kernel (Kernel) layer. A native module (a module filled by vertical lines in the figure) includes an Android package (Android Package, APK) at the APP layer; a telephony manager (Telephony Manager), a connection manager (Connection Manager), and an activity manager (activity manager) at the framework manager; a radio interface layer (Radio Layer Interface, Rild) at the HAL layer; security, tools (tools), and a network (net) at the kernel layer; and the like. In this embodiment of the present invention, some modules (non-filled modules shown in the figure) are newly added based on the native module, such as a driver (Driver), a service identification module, and a service request module. In addition, the terminal further stores a configuration file, the service identification module reads the configuration file to perform service identification, and the service request module interacts with the AF to update the configuration file. The following describes in detail the newly added modules.

The driver module, that is, a driver module is configured to monitor a status of a socket in the kernel and a data upstream/downstream state, and interacts with the service identification module, to instruct the service identification module to perform identification.

Specifically, for a specific socket, monitoring a status of the socket means reporting different states of the socket to the service identification module after it is detected that the status of the socket changes. For example, it is assumed that the socket includes 11 states. The 11 states are as follows: A CLOSED state indicates that the socket is not used; a LISTEN state indicates that the socket is listening to an incoming connection; a SYN_SENT state indicates that the socket is attempting to actively establish a connection; a SYN_RECEIVED state indicates that the socket is in an initial synchronization state of the connection; an ESTABLISHED state indicates that the connection of the socket has been established; a CLOSE_WAIT state indicates that a remote socket is closed, and the socket is waiting for closure; a FIN_WAIT_1 state indicates that the socket has been closed, and the connection is being disabled; a CLOSING state indicates that the socket has been closed, the remote socket is being closed, and a closure acknowledgement is temporarily suspended; a LAST_ACK state indicates that the remote socket has been closed, and is waiting for the closure acknowledgement of a local socket; a FIN_WAIT_2 state indicates that the socket has been closed, and the remote socket is waiting for closure; and a TIME_WAIT state indicates that the socket has been closed, and is waiting for transfer of the closure of the remote socket. When the driver detects a newly established socket that is in the ESTABLISHED state, the driver module reports the ESTABLISHED state to the service identification module. When further detecting that the socket is switched to the CLOSED state, the driver reports the CLOSED state to the service identification module.

For a specific socket, monitoring a data upstream/downstream state means monitoring, when upstream data is sent by using the socket, whether a service keyword can be found from the upstream data; and similarly, monitoring, when downstream data is received by using the socket, whether a service keyword can be found from the downstream data.

After receiving a notification reported by the driver module, the service identification module enables service identification, further parses the configuration file, performs service identification according to configuration, obtains a 5-tuple from a key service, and sends the 5-tuple and the like to the service request module. The configuration file records that which PS service is a PS service that needs to be identified, and a rule of how to determine a socket as a key socket according to a weight. The configuration file may be delivered by the AF by using an over the air technology (Over-the-Air Technology, OTA), and the configuration file exists on both the AF and UE. In this way, the AF and the UE may negotiate about acceleration of some services, that is, the UE may apply for a resource for a key socket in multiple sockets corresponding to a PS service. For example, if the user wants video play to be fluent, the user requests the AF to accelerate a video service, and this is similar to opening an acceleration channel of a Xunlei member. The configuration file may be generated by using code and the like, for example:

```
<?xml version="1.0" encoding="utf-8"?>
<list>
    <app package_name="com.xxx.xxx">
        <priority>8</priority>
        <type>6</type>
        <MaximumUpStreamSpeedRate>10000
        </MaximumUpStreamSpeedRate>
<MaximumDownStreamSpeedRate>400000
```

```
</MaximumDownStreamSpeedRate>
        <keyword>xxxxx<keyword>
    </app>
    <app package_name="com.xxx.xxxx">
        <priority>8</priority>
        <type>6</type>
        <MaximumUpStreamSpeedRate>10000
        </MaximumUpStreamSpeedRate>
<MaximumDownStreamSpeedRate>400000
<MaximumDownStreamSpeedRate>
    </app>
</list>
```

For the foregoing code, description of each field is shown in Table 1.

TABLE 1

| Field name | Description |
| --- | --- |
| Package Name | Application package name |
| Priority | Priority of a QoS attribute, where a value ranges from 1 to 15, and a larger value indicates a higher priority. |
| Type | The type includes:<br>☐0: Audio<br>☐1: Video<br>☐2: Data<br>☐3: Application<br>☐4: Control<br>☐5: Text<br>☐6: Message<br>☐0xFFFFFFFF: Other |
| Maximum UpStream Speed Rate | Maximum upstream speed rate with a unit of bit/s |
| Maximum DownStream Speed Rate | Maximum downstream speed rate with a unit of bit/s |
| keyword | Service keyword |

In this embodiment of the present invention, the service identification module may determine, in the following manners, a weight and whether a socket is a key socket.

Manner A: Determine a weight according to survival duration of a socket.

In this manner, a weight of a socket indicates survival duration of the socket. In the PS service identification process, the terminal first determines survival duration of each of at least one socket, and then uses, as a key socket, a socket that is in the at least one socket and whose survival duration exceeds a first threshold. A connection of the key socket is a Transmission Control Protocol TCP persistent connection.

Specifically, for a socket that needs to be identified, the service identification module collects statistics about survival duration of the socket, and assigns different weights to the socket according to the duration. Generally, longer survival duration indicates a larger weight. When the survival duration exceeds the first threshold, the socket is considered as a key socket, and a connection of the key socket is a Transmission Control Protocol (Transmission Control Protocol, TCP) persistent connection. For example, it is assumed that a PS service A is mainly used for message exchange between the terminal and a server. Multiple sockets corresponding to the PS service include a long-term used socket. Statistics about survival duration of each socket are collected, so that the long-term used socket can be identified from the multiple sockets. The long-term used socket is a key socket, and a connection of the long-term used socket is a TCP persistent connection. Different first thresholds may be set for different PS services, so that identification is implemented at a PS service level. Certainly, different thresholds may be set for different sockets, so that identification is implemented at a socket level.

Manner B: Determine a weight according to an interaction frequency between a socket and a service server.

In this manner, a weight indicates an interaction frequency between a socket and a server, a weight of a socket indicates an interaction frequency between the socket and the service server, and the service server is a server that bears a service corresponding to the socket. In this case, in a PS service identification process, the terminal first determines an interaction frequency between each of the at least one socket and the service server, and then uses, as a key socket, a socket that is in the at least one socket and whose interaction frequency exceeds a second threshold. A connection of the key socket is a Transmission Control Protocol TCP short connection or a User Datagram Protocol UDP short connection. Different second thresholds may be set for different PS services, so that identification is implemented at a PS service level. Certainly, different second thresholds may be set for different sockets, so that identification is implemented at a socket level.

Specifically, for a socket that needs to be identified, the service identification module collects statistics about an interaction frequency between the socket and the service server, that is, determines how many times the socket and the service server interact in a unit of time, how much data is exchanged between the socket and the service server in a unit of time, or the like; and assigns different weights according to the interaction frequency. Generally, a higher interaction frequency indicates a larger weight. When the interaction frequency exceeds the second threshold, the socket is considered as a key socket. A connection corresponding to the key socket is a TCP short connection or a User Datagram Protocol (User Datagram Protocol, UDP) short connection. For example, it is assumed that message exchange between a PS service B and the service server is periodic, that is, the PS service B and the service server are disconnected occasionally, but are reconnected after a time period. Statistics about a quantity of interaction times are collected, so that an interaction frequency is obtained. Therefore, a socket that is in multiple sockets corresponding to the PS service and whose interaction frequency exceeds the second threshold is identified, and the socket whose interaction frequency exceeds the second threshold is a key socket.

Manner C: Determine a weight according to identification key of a service keyword.

In this manner, a weight of a socket indicates an importance degree of a service keyword corresponding to the socket. In a PS service identification process, the terminal first determines an importance degree of a service keyword corresponding to each of the at least one socket, and then uses, as a key socket, a socket that is in the at least one socket and whose importance degree of a service keyword exceeds a third threshold. Different third thresholds may be set for different PS services, so that identification is implemented at a PS service level. Certainly, different third thresholds may be set for different sockets, so that identification is implemented at a socket level. In addition, the third threshold may not be set for a service keyword. Instead, a socket is used as a key socket provided that the service keyword is identified.

Specifically, for a socket that needs to be identified, the service identification module identifies a service keyword of the socket, and assigns different weights according to the service keyword. Generally, a higher importance degree of the service keyword indicates a larger weight of the socket. When the importance degree of the service keyword exceeds the third threshold, the socket is considered as a key socket. For example, a PS service C is a service with an extremely high priority, but occurs occasionally without a clear rule. In this case, PS service identification may be performed by using a keyword, so that the PS service is identified as a key service.

In this embodiment of the present invention, a weight of a socket may be determined independently in any one of the Manner A, the Manner B, or the Manner C; or a weight of a socket may be determined by combining the Manner A, the Manner B, and the Manner C, and in this case, the weight is an accumulated weight. The following provides detailed description of calculating a weight by combining the Manner A, the Manner B, and the Manner C.

Specifically, from a perspective of connectivity, the 11 states of the socket may mainly fall into two types: a connected mode and a disconnected mode. The connected mode includes the ESTABLISHED stated, the TCP_SYN_SENT state, the TCP_SYN_RECV state, and the TCP_LISTEN state. The disconnected mode includes the seven remaining states. In this embodiment of the present invention, it is assumed that the service identification module can record a maximum of 20 pieces of socket information. For a specific socket, within a period, if the socket is a socket that occurs first, when the service identification module first receives a report result that is of the driver and indicates that a state of the socket is any of the four states included in the connected mode, the service identification module sets a weight of the socket to 1 according to a PS service type; or when the service identification module first receives a report result that is of the driver and indicates that a state of the socket is any of the seventh states included in the disconnected mode, the service identification module decreases a weight of the socket by 1; or when the socket already exists in a socket queue recorded by the service identification module, if the service identification module receives again a report result that is of the driver and indicates that a state of the socket is in the connected mode, because the socket already exists in the queue recorded by the service identification module, the service identification module increases a weight of the socket by 2. In addition, when upstream data is sent, if a service keyword can be found from the upstream data, the weight of the socket is increased by 5. Similarly, when downstream data is received, if a service keyword can be found from the downstream data, the weight of the socket is also increased by 5. The service keyword may be obtained by reading the configuration file.

It should be noted that the foregoing driver module reports the state of the socket according to the connected mode and the disconnected mode, that is, the driver module detects all the 11 states of the socket. However, no limitation is imposed in the present invention. In another feasible implementation, the driver module may detect only two states: the ESTABLISHED state and the CLOSED state. That is, within a period, if the ESTABLISHED state is detected, the weight is increased by 1; or if the CLOSED is detected, the weight is decreased by 1.

For all recorded sockets, the service identification module calculates an accumulated weight once within each period, and increases a weight of a socket in the connected mode in these sockets by 1 within each period. In this case, duration of an accumulated period may be understood as survival duration of a socket. For example, the accumulated weight is calculated at an interval of 30 s. If the socket is in the connected mode after a first period expires, the survival duration of the socket is considered as 30 s, and if the socket is still in the connected mode after a second period expires, the survival duration of the socket is considered as 60 s. For a specific socket, if a weight of the socket exceeds the first threshold in the configuration file, the socket is considered as a key socket. In addition, within a period, a quantity of times the socket is continually connected and disconnected, a quantity of times of data receiving and sending, an amount of received data and sent data, and the like may be understood as an interaction frequency between the socket and the service server. If the interaction frequency exceeds the second threshold in the configuration file, the socket is considered as a key socket. Finally, a weight of the socket may be separately determined according to an importance degree of a service keyword. If the importance degree of the service keyword exceeds the third threshold, the socket is considered as a key socket.

It should be noted that the present invention is described in detail by using an example that the period is of 30 s. However, no limitation is imposed in the present invention. In another feasible implementation, different periods may be set, for example, different periods are separately set for a persistent connection and a short connection.

In addition, because the network side allocates a limited quantity of resources to the terminal, the service identification module can record a limited quantity of sockets. For example, when the service identification module can record a maximum of 20 sockets, if the driver reports a new socket, the service identification module may delete, from the recorded sockets, a socket that is in the disconnected mode and has a smallest weight, and then identify the new socket.

The service request module updates the configuration file by interacting with the AF, receives an identification result such as a 5-tuple sent by the service identification module, and sends the identification result to the AF.

103. The terminal sends an identifier of the key socket to a network side device.

In this step, the terminal sends the identifier of the key socket, such as a 5-tuple of a socket, a service identifier of a PS service, and a terminal identifier to the network side device by using the service request module. For example, the terminal sends the identifier to the AF, so that the AF forwards the information to a corresponding PCRF server according to the terminal identifier, and the PCRF server formulates a PCC rule. For another example, the terminal sends the identifier to the PCEF server, and the PCEF server forwards the information to a corresponding PCRF server. For still another example, the terminal directly sends the identifier to the PCRF server. However, generally, because a current communications architecture includes a relatively large quantity of PCEF servers and a relatively large quantity of PCRF servers, if the identifier is directly sent to the PCRF server or forwarded by the PCEF server, a process is complex. Therefore, a sending manner in which the identifier is sent to the AF, and then the AF sends the identifier to the PCRF server is preferably selected. The formulated PCC rule in this embodiment of the present invention may be: allocating a specific bandwidth and a specific speed rate, or authorizing obtaining of a specific resource. This is not specifically limited in this embodiment of the present invention.

In a sending process, an identifier may be sent according to a weight. In this case, the terminal sequentially sends identifiers of at least two key sockets to the network side device according to weights of the at least two key sockets.

In addition, the key socket may be determined in the Manner A and the Manner B first. In these sockets, a 5-tuple of a socket in the connected mode is first sent, and then a 5-tuple of a socket in the disconnected mode is sent.

Certainly, the key socket may be determined in the Manner C, and 5-tuples of all or some key sockets are sent according to a resource allocated by the network side and the like.

In the packet switched service identification method provided in this embodiment of the present invention, the terminal determines the weight of the at least one socket corresponding to the packet switched PS service; determines the key socket from the at least one socket according to the weight of the at least one socket; and finally, sends the identifier of the key socket to the network side, so that the network side formulates the PCC rule according to a 5-tuple. In this identification process, because the terminal does not encrypt the PS service before sending the PS service, the terminal can accurately identify the PS service. In addition, for a specific PS service, the terminal may determine an application that is of the terminal and to which the PS service belongs, and does not need to perform parsing. Therefore, PS service identification accuracy can be further improved.

In the following, the packet service identification method in the present invention is described in detail by using another specific application scenario.

A WeChat application is used as an example. An important PS service included in the WeChat application is, for example, a red packet grabbing service. For the red packet grabbing service, three identification rules are configured in the configuration file: (1) a TCP persistent connection, where the first threshold is As; (2) a short connection, where the second threshold is C times/B minutes; and (3) a keyword D of an upstream service is "grabbing a red packet". In a PS service identification process, when detecting that a status of a socket included in the WeChat changes, the driver module reports the status and a 5-tuple to the service identification module. In addition, each time downstream data is received or upstream data is sent, a data packet (an upstream data packet or a downstream data packet) and a socket that bears the data packet are sent to the service identification module.

When receiving a message indicating that the status of the socket changes, the service identification module updates a status of the 5-tuple of the socket, and counts a quantity of connection times of the socket. If the quantity of connection times exceeds C times within the B minutes, the service identification module sets a specific weight. In addition, the service identification module further periodically detects survival duration of the socket, for example, if a period is of Es, the service identification module performs detection at an interval of Es, so as to detect whether the survival duration of the socket meets the threshold for the TCP persistent connection, that is, whether the survival duration exceeds the first threshold (As). If the survival duration of the socket exceeds the first threshold, the service identification module sets a specific weight. When an upstream data packet is sent or a downstream data packet is received, it is whether the upstream/downstream data packet includes a service keyword. For example, it is detected whether the upstream data packet includes the service keyword D, and if the upstream data packet includes the service keyword D, the service identification module sets a corresponding weight.

Figure 6:
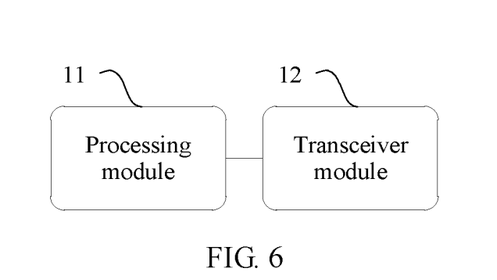
FIG. 6 is a schematic structural diagram of Embodiment 1 of a terminal according to the present invention.

FIG. 6 is a schematic structural diagram of Embodiment 1 of a terminal according to the present invention. The terminal provided in this embodiment may implement steps of a method that is applied to the terminal and is provided in any embodiment of the present invention. Specifically, the terminal provided in this embodiment includes:

a processing module 11, configured to: determine a weight of at least one socket, where the at least one socket is a socket included in a packet switched PS service, and determine a key socket from the at least one socket according to the weight of the at least one socket; and a transceiver module 12, configured to send an identifier of the key socket to a network side device.

According to the terminal provided in this embodiment of the present invention, the weight of the at least one socket corresponding to the packet switched PS service is determined; the key socket is determined from the at least one socket according to the weight of the at least one socket; and finally, the identifier of the key socket is sent to the network side, so that the network side formulates a PCC rule according to the 5-tuple. In this identification process, because the terminal does not encrypt the PS service before sending the PS service, the terminal can accurately identify the PS service. In addition, for a specific PS service, the terminal may determine an application that is of the terminal and to which the PS service belongs, and does not need to perform parsing. Therefore, PS service identification accuracy can be further improved.

Optionally, in an embodiment of the present invention, the weight of the socket indicates survival duration of the socket, and the processing module 11 is specifically configured to: determine survival duration of each of the at least one socket, and use, as a key socket, a socket that is in the at least one socket and whose survival duration exceeds a first threshold. A connection of the key socket is a Transmission Control Protocol TCP persistent connection.

Optionally, in an embodiment of the present invention, the weight of the socket indicates an interaction frequency between the socket and the service server, and the service server is a server that bears a service corresponding to the socket.

The processing module 11 is specifically configured to: determine an interaction frequency between each of the at least one socket and the service server, and use, as a key socket, a socket that is in the at least one socket and whose interaction frequency exceeds a second threshold. A connection of the key socket is a Transmission Control Protocol TCP short connection or a User Datagram Protocol UDP short connection.

Optionally, in an embodiment of the present invention, before determining the weight of the at least one socket, the processing module 11 is further configured to detect that a status of the at least one socket changes.

Optionally, in an embodiment of the present invention, the weight of the socket indicates an importance degree of a service keyword corresponding to the socket.

The processing module 11 is specifically configured to: determine an importance degree of a service keyword corresponding to each of the at least one socket, and use, as a key socket, a socket that is in the at least one socket and whose importance degree of a service keyword exceeds a third threshold.

Optionally, in an embodiment of the present invention, before determining the weight of the at least one socket, the processing module 11 is further configured to: find the service keyword from upstream data, or find the service keyword from downstream data.

Optionally, in an embodiment of the present invention, before determining the weight of the at least one socket, the processing module 11 is further configured to: determine a set of key PS services, and determine that the PS service belongs to the set of key PS services.

Optionally, in an embodiment of the present invention, there are at least two key sockets, and the transceiver module 12 is specifically configured to sequentially send identifiers of the at least two key sockets to the network side device according to weights of the at least two key sockets.

Figure 7:
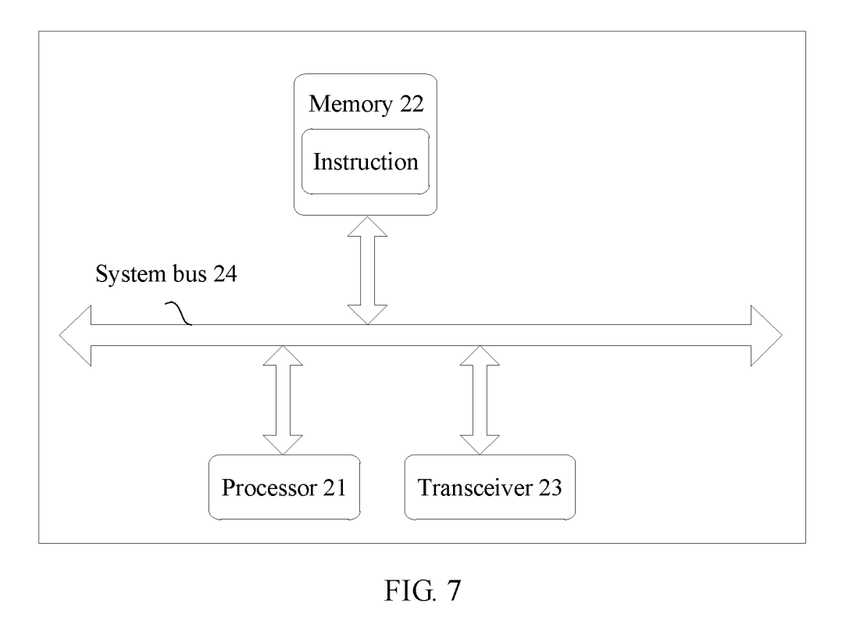
FIG. 7 is a schematic structural diagram of Embodiment 2 of a terminal according to the present invention.

FIG. 7 is a schematic structural diagram of Embodiment 2 of a terminal according to the present invention. The terminal provided in this embodiment may implement steps of a method that is applied to the terminal and is provided in any embodiment of the present invention. Specifically, the terminal provided in this embodiment includes:

a processor 21, a memory 22, a transceiver 23, and a system bus 24. The memory 22, the transceiver 23, and the processor 21 are connected and implement mutual communication by using the system bus 24.

The processor 21 is a control center of the terminal, and is connected to all parts of the entire terminal by using various interfaces and cables. The processor 21 runs or executes a software program and/or a module stored in the memory 22, and invokes data stored in the memory 22, to execute various functions of the terminal and process data, so that overall monitoring is performed on the terminal. Optionally, the processor 21 may include one or more processing units. Preferably, an application processor and a modem processor may be integrated into the processor 21. The application processor mainly processes an operating system, a user interface, an application program, and the like; and the modem processor mainly processes wireless communication. It may be understood that the foregoing modem processor may not be integrated into the processor 21.

The memory 22 may be configured to store a software program and a module. The processor 21 runs the software program and the module that are stored in the memory 22, to perform various functional applications of the terminal and process data. The memory 22 may mainly include a program storage area and a data storage area. The program storage area may store an operating system, an application program (such as a Phone Manager) that is required by at least one function, and the like; and the data storage area may store data (such as configuration information or a database) created according to use of the terminal, and the like. In addition, the memory 22 may include a high-speed random access memory, and may further include a nonvolatile memory, such as at least one magnetic disk storage component, a flash memory component, or another volatile solid-state storage component.

The transceiver 23 may be configured to receive and send a signal in a data receiving and sending process. Particularly, after receiving downlink information of a base station, the transceiver 23 sends the downlink information to the processor 21 for processing, and sends designed uplink data to the base station. Generally, an RF circuit includes but is not limited to an antenna, at least one amplifier, a transceiver, a coupler, an LNA (Low Noise Amplifier, low noise amplifier), a duplexer, or the like. The transceiver 23 may communicate with a network and another device by means of wireless communication.

Persons skilled in the art may understand that a structure of the terminal shown in FIG. 7 imposes no limitation on the terminal, and may include more or fewer components than those shown in the figure, or combine some components, or have different component arrangements. This is not specifically limited in this embodiment of the present invention.

Specifically, the processor 21 may be configured to: determine a weight of at least one socket, where the at least one socket is a socket included in a packet switched PS service, and determine a key socket from the at least one socket according to the weight of the at least one socket.

The transceiver 23 is configured to send an identifier of the key socket to a network side device.

According to the terminal provided in this embodiment of the present invention, the weight of the at least one socket corresponding to the packet switched PS service is determined; the key socket is determined from the at least one socket according to the weight of the at least one socket; and finally, the identifier of the key socket is sent to the network side, so that the network side formulates a PCC rule according to the 5-tuple. In this identification process, because the terminal does not encrypt the PS service before sending the PS service, the terminal can accurately identify the PS service. In addition, for a specific PS service, the terminal may determine an application that is of the terminal and to which the PS service belongs, and does not need to perform parsing. Therefore, PS service identification accuracy can be further improved.

Optionally, in an embodiment of the present invention, the weight of the socket indicates survival duration of the socket, and the processor 21 is specifically configured to: determine survival duration of each of the at least one socket, and use, as a key socket, a socket that is in the at least one socket and whose survival duration exceeds a first threshold. A connection of the key socket is a Transmission Control Protocol TCP persistent connection.

Optionally, in an embodiment of the present invention, the weight of the socket indicates an interaction frequency between the socket and the service server, and the service server is a server that bears a service corresponding to the socket.

The processor 21 is specifically configured to: determine an interaction frequency between each of the at least one socket and the service server, and use, as a key socket, a socket that is in the at least one socket and whose interaction frequency exceeds a second threshold. A connection of the key socket is a Transmission Control Protocol TCP short connection or a User Datagram Protocol UDP short connection.

Optionally, in an embodiment of the present invention, before determining the weight of the at least one socket, the processor 21 is further configured to detect that a status of the at least one socket changes.

Optionally, in an embodiment of the present invention, the weight of the socket indicates an importance degree of a service keyword corresponding to the socket.

The processor 21 is specifically configured to: determine an importance degree of a service keyword corresponding to each of the at least one socket, and use, as a key socket, a socket that is in the at least one socket and whose importance degree of a service keyword exceeds a third threshold.

Optionally, in an embodiment of the present invention, before determining the weight of the at least one socket, the processor 21 is further configured to: find the service keyword from upstream data, or find the service keyword from downstream data.

Optionally, in an embodiment of the present invention, before determining the weight of the at least one socket, the processor 21 is further configured to: determine a set of key PS services, and determine that the PS service belongs to the set of key PS services.

Optionally, in an embodiment of the present invention, there are at least two key sockets, and the transceiver 23 is specifically configured to sequentially send identifiers of the at least two key sockets to the network side device according to weights of the at least two key sockets.

An embodiment of the present invention further provides another terminal PS service identification and monitoring method. Generally, without designating a port, a terminal randomly allocates an available port to each service of an application or to a socket of a service. For example, the terminal may randomly allocate any available port in a range of 32768 to 61000 to a socket of a red packet grabbing service in WeChat. Therefore, the terminal and a server cannot learn, according to only an allocated port corresponding to a terminal service, a service that is of an application of the corresponding terminal and to which a socket corresponding the port belongs. It may be understood that the server is a network side device that is also referred to as a network device, and includes but is not limited to an AF, a PCRF, and a PCEF in the foregoing embodiment. This is not specifically limited in this embodiment of the present invention.

In this embodiment of the present invention, the terminal may configure a corresponding terminal-side port range for an application that needs to be monitored. From a perspective of the terminal, a configured port may be referred to as a local port. For example, the terminal may configure 100 terminal-side ports in a range of 50001 to 50100 for a WeChat application, and another application uses another terminal-side port. In addition, the terminal sends a correspondence between the terminal-side port and the corresponding application to the network device. Therefore, provided that it is detected a terminal-side port of a socket related to the terminal falls within the range of 50001 to 50100, the terminal or the network device may directly determine that the socket belongs to a related service of the WeChat application of the terminal. Therefore, the terminal may identify a terminal-side port of a socket, so as to identify an application that needs to be monitored, that is, a key application. Optionally, the terminal may configure a corresponding terminal-side port range for each application that needs to be monitored. In this case, the terminal may configure, in an existing manner of randomly allocating a terminal-side port, a port range for another application that does not need to be monitored. Alternatively, the terminal may configure a corresponding terminal-side port range for all applications on the terminal. The foregoing cases are not specifically limited in this embodiment of the present invention. Optionally, the terminal may configure a terminal-side port by using a network (net) module in a kernel (Kernel). It may be understood that terminal-side port configuration may be controlled by the network side device or another associated device.

After the terminal configures a correspondence between a terminal-side port and a key application, the network device may formulate a corresponding PCC rule for the key application. For example, a user purchases a specific network service for the WeChat application on the terminal. After identifying the socket corresponding to the port in the range of 50001 to 50100, the network device may accelerate a PS service corresponding to the socket, for example, increase a speed rate or allocate a higher bandwidth.

Specifically, the terminal may separately store a currently available port and a used port by using two queues which are respectively referred to as an available queue and a used queue. When the terminal needs to allocate a local port to a service, the terminal may select a port from the available queue for use, such as the first port in the available queue, delete the port from the available queue, and add the port to the used queue. When use of a port is completed and the port is released, the terminal may delete the port from the used queue, and adds the port to a tail of the available queue. Compared with an existing random allocation algorithm, this algorithm has a larger allocation speed. It may be understood that, for each application that needs to be monitored, that is, a key application, the terminal may store a corresponding available port and a corresponding used port by using two queues. Alternatively, for a key application, the terminal may always store, by using two queues, an identifier that is related to each key application and that can be carried in the queue; or use, as a selection condition, a port range that is of a current key application and is carried when the terminal searches for an available port of the key application, and use two other queues for a non-key application. The terminal may have multiple port configuration manners. This is not specifically limited in this embodiment of the present invention.

A service identification module of the terminal can identify an application that currently runs, and a foreground and background status existing when the program runs. Optionally, the terminal may set a priority of a key application with reference to a configured port and the foreground and background status existing when the application runs.

After the terminal configures, according to a port range set for an application, a terminal-side port to be used by a service of an application, the service identification module may fill an identifier of a socket, such as a source IP address, a source port number, and a protocol type information in the 5-tuple. Next, the terminal sends the identifier of the socket to the network side device, so as to implement communication of the service or to formulate a related PCC rule.

In the foregoing port configuration manner of the terminal, the network device may formulate a same PCC rule for all services of a key application of the terminal, for example, accelerating all the services of the key application of the terminal, like increasing a speed rate or a bandwidth. Alternatively, the terminal may set different priorities for multiple key applications with reference to the detected foreground and background running status, and allocate more network resources to all services of an application with a higher priority. Optionally, the terminal may identify a key socket of a key PS service with reference to the foregoing port configuration method and a method for determining a weight of a socket in the foregoing embodiment, so that a PCC rule formulated by the network device for the terminal is more flexible and refined. Therefore, more network resources are obtained for a service corresponding to a key socket in a key application, and a user requirement is better met.

Specifically, after configuring a local port for a key application according to a port range of the application, the terminal may monitor only a socket in the port range corresponding to the key application, and determines a weight of the socket in the corresponding port range in the Manner A, the Manner B, or the Manner C in the foregoing embodiment, that is, determines, in the port range corresponding to the key application, the weight of the socket according to survival duration of the socket, an interaction frequency between the socket and a service server, or a service keyword included in content corresponding to the socket, to identify a key socket. Then, the terminal sends the identified key socket to the network device. The network device may set different service request classes according to the weight of the socket or another priority. The network device includes but is not limited to the AF, PCRF, and PCEF in the foregoing embodiment. For a specific manner, refer to the foregoing embodiment. Details are not described herein again.

It may be understood that both configuring a corresponding local port range for a key application, and monitoring and identifying a key socket may be implemented by the processing module 11 of the terminal shown in FIG. 6, or may be implemented by the processor 21 of the terminal shown in FIG. 7. Details are not described herein.

Persons of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are only intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A packet switched (PS) service identification method, comprising:
   determining, by a terminal, a weight of at least one socket, wherein the at least one socket is comprised in a PS service socket, wherein the weight of the at least one socket is determined according to an interaction frequency between the at least one socket and a service server, and wherein the service server is a server bearing a service corresponding to the at least one socket;
   determining, by the terminal, a key socket from the at least one socket according to the weight of the at least one socket, wherein determining the key socket from the at least one socket comprises setting, by the terminal as the key socket, a socket in the at least one socket whose interaction frequency exceeds a threshold, and wherein a coupling of the key socket is a Transmission Control Protocol (TCP) short coupling or a User Datagram Protocol (UDP) short coupling; and
   sending, by the terminal, an identifier of the key socket to a network side device.

2. The PS service identification method of claim 1, wherein the weight of the at least one socket is further determined according to survival duration of the at least one socket.

3. The PS service identification method of claim 2, wherein before determining the weight of the at least one socket, the method further comprises detecting, by the terminal, that a status of the at least one socket changes.

4. The PS service identification method of claim 1, wherein the weight of the at least one socket is further determined according to an importance degree of a service keyword corresponding to the at least one socket.

5. The PS service identification method of claim 4, wherein before determining the weight of the at least one socket, the method further comprises searching, by the terminal, the service keyword from upstream data or downstream data.

6. The PS service identification method of claim 1, wherein before determining the weight of the at least one socket, the method further comprises:
   determining, by the terminal, a set of key PS services; and
   determining, by the terminal, that the PS service belongs to the set of key PS services.

7. The PS service identification method of claim 1, wherein the at least one socket further comprises at least two key sockets, and wherein sending the identifier of the key socket to the network side device comprises sequentially sending, by the terminal, identifiers of the at least two key sockets to the network side device according to weights of the at least two key sockets.

8. The PS service identification method of claim 1, wherein the network side device comprises at least one of the following devices:
   an application function (AF);
   a policy and charging enforcement function (PCEF) server; or
   a policy and charging rules function (PCRF) server.

9. The PS service identification method of claim 1, wherein before determining the weight of the at least one socket, the method further comprises determining, by the terminal, a key application according to the at least one socket and a port corresponding to the terminal, and wherein determining the weight of the at least one socket comprises determining, by the terminal, a weight of at least one socket of the key application.

10. A terminal, comprising:
   a memory configured to store a computer execution instruction;
   a processor coupled to the memory using a system bus, the computer execution instruction causing the processor to be configured to:
      determine a weight of at least one socket, wherein the at least one socket is comprised in a packet switched (PS) service, and wherein the weight of the at least one socket is determined according to an importance degree of a service keyword corresponding to each of the at least one socket;
      determine a key socket from the at least one socket according to the weight of the at least one socket; and
      set a socket in the at least one socket whose importance degree of a service keyword exceeds a threshold as the key socket; and
   a transceiver coupled to the memory and the processor using the system bus and configured to send an identifier of the key socket to a network side device.

11. The terminal of claim 10, wherein the weight of the at least one socket is further determined according to survival duration of the at least one socket.

12. The terminal of claim 11, wherein before determining the weight of the at least one socket, the computer execution instruction further causes the processor to be configured to detect that a status of the at least one socket changes.

13. The terminal of claim 11, wherein before determining the weight of the at least one socket, the computer execution instruction further causes the processor to be configured to:
   determine a set of key PS services; and
   determine that the PS service belongs to the set of key PS services.

14. The terminal of claim 11, wherein the at least one socket further comprises at least two key sockets, and wherein, to send an identifier of the key socket to a network side device, the transceiver is further configured to sequentially send identifiers of the at least two key sockets to the network side device according to weights of the at least two key sockets.

15. The terminal of claim 10, wherein the weight of the at least one socket is further determined according to an interaction frequency between the at least one socket and a service server, and wherein the service server is a server bearing a service corresponding to the at least one socket.

16. The terminal of claim 10, wherein before determining the weight of the at least one socket, the computer execution instruction further causes the processor to be configured to search the service keyword from upstream data or downstream data.

17. The terminal of claims 10, wherein the network side device comprises at least one of the following devices:
   an application function (AF);
   a policy and charging enforcement function (PCEF) server; or
   a policy and charging rules function (PCRF) server.

18. A device comprising:
   a non-transitory computer-readable storage medium storing a program; and
   a processor coupled to the non-transitory computer-readable storage medium, the program causing the processor to be configured to:
      determine a weight of at least one socket, wherein the at least one socket is a socket comprised in a packet switched (PS) service socket, wherein the weight of the at least one socket is determined according to an interaction frequency between the at least one socket and a service server, and wherein the service server is a server bearing a service corresponding to the at least one socket;
      determine a key socket from the at least one socket according to the weight of the at least one socket, wherein determining the key socket from the at least one socket comprises setting, by the terminal as the key socket, a socket in the at least one socket whose interaction frequency exceeds a threshold, and wherein a coupling of the key socket is a Transmission Control Protocol (TCP) short coupling or a User Datagram Protocol (UDP) short coupling; and
      send an identifier of the key socket to a network side device.

19. The device of claim 18, wherein the network side device comprises at least one of the following devices:
   an application function (AF);
   a policy and charging enforcement function (PCEF) server; or
   a policy and charging rules function (PCRF) server.

20. The device of claim 18, wherein the weight of the at least one socket is further determined according to an importance degree of a service keyword corresponding to the at least one socket.

* * * * *